United States Patent Office 2,910,443
Patented Oct. 27, 1959

2,910,443
HARDENING PASTE FOR THE POLYMERIZATION OF ORGANIC COMPOUNDS

Erich Bäder, Hanau (Main), Germany, assignor to Deutsche Gold- und Silber-Scheideanstalt vormals Roessler, Frankfurt am Main, Germany No Drawing. Application July 25, 1956
Serial No. 599,923

Claims priority, application Germany July 27, 1955

6 Claims. (Cl. 252—430)

The present invention relates to improvements in hardening pastes for use in promoting the polymerization of polymerizable unsaturated organic compounds.

It is known that unsaturated organic compounds can be polymerized in the presence of organic peroxidic compounds and amines which also may contain one or more $SO_2$ groups. This procedure, for example, has been used for the polymerization of the unsaturated polyesters of the so-called casting resins. The catalytically acting redox system renders it possible to complete the polymerization in a relatively short time without addition of heat from an external source.

However, in the practical application of this procedure, it was found that polymerization is initiated as soon as the polymerizable substances are admixed with the catalysts, so that the mixtures only possess a very short "pot-life." It was therefore proposed to divide the mixture to be polymerized into two parts, one of which contained the peroxidic component of the redox system and the other the amine. Also in this instance difficulties were encountered partly through a low "pot-life" of the components and because of the complications in use.

It has also been proposed to produce substantially or completely water free pastes of organic peroxides by kneading a moist organic peroxide with a plasticizer to produce a coherent mass and removing the water which escapes. Such pastes or masses can be used as additions to the polymerizable compositions. In use, however, they do not avoid the difficulties encountered during the admixture of the amine. Consequently, attempts were made to disperse the peroxidic compounds and the amines in a high boiling liquid which is as viscous as possible, such as, for example, a plasticizer, and to add this catalyst mixture to the polymerizable compound or mixture shortly before use. It was found, however, that it, in general, was not possible to keep mixtures of amines and peroxides dissolved or dispersed in a liquid without such catalyst components rapidly reacting with each other and at times with explosive violence. This result was to be expected, as it was known that tertiary amines and peroxides react with each other with extraordinary vigor (see, for example, Chemische Berichte, vol. 86, pages 1071–2, 1953).

According to the invention, it was discovered unexpectedly that these reactions do not occur when organic peroxides are mixed with secondary or tertiary amines which contain one or more $SO_2$ groups in $\alpha$ position to the nitrogen atom. The hardening pastes according to the invention therefore contain at least one organic peroxidic compound and at least one tertiary or secondary amine which contains one or more $SO_2$ groups in $\alpha$ position to the nitrogen atom dispersed in an inert liquid preferably of high viscosity. The hardening pastes according to the invention can be prepared by conventional methods, for example, by mixing, kneading or trituration on rolls.

The hardening pastes according to the invention can be used with excellent results for the polymerization of the most varied organic polymerizable compounds or mixtures. They are especially well suited for use in the polymerization of unsaturated polyester resins, which may also contain other components taking part in the polymerization, such as, for example, styrene, acrylic and methacrylic acid esters and the like.

An advantage of the hardening pastes according to the invention is that an excellent uniform distribution of the catalyst components is achieved and that therefore they are easily worked into the substances or mixtures to be polymerized.

In order to be able to produce and work up the hardening pastes according to the invention in an easy and simple manner, it is advantageous to select liquids of high boiling point as the inert liquid. The usual plasticizers, such as, for example, dibutyl phthalate, dioctyl phthalate, tricresyl phosphate or silicones, have been found excellently suited as the inert liquids for the preparation of the hardening pastes according to the invention.

It was found that secondary or tertiary amines in which the $SO_2$ group is attached to an aromatic radical are particularly advantageous and long lived when used in the preparation of the hardening pastes according to the invention.

The hardening pastes according to the invention can also contain relatively small quantities of heavy metals or heavy metal compounds as activators in addition to the peroxidic compounds and the amines.

It is also advantageous to incorporate extremely finely divided oxides of metals in the hardening pastes according to the invention in order to prevent a phase separation. Such oxides are, for example, oxides, such as silica or aluminum oxide, having a particle size of below 25 m$\mu$ produced by the decomposition of volatile metal or metalloid compounds, such as silicon tetrachloride or aluminum chloride, in the vapor phase at temperatures over 600° C. with water vapor and/or oxygen.

In the following Table 1, mixtures of various amines and peroxides are given which were converted to pastes with dibutyl or dioctyl phthalate. These resulting pastes were stored at temperatures between 37° C. and 50° C. and their stability observed. The tests have not yet been completed, but up to now none of such mixtures has decomposed. The longest storage period observed was over two months.

TABLE 1

| | $\alpha$-sulfone-substituted amine | Peroxide |
|---|---|---|
| 1 | $(C_6H_5SO_2CH_2)_2NH$ | Dichlorobenzoylperoxide. |
| 2 | $(CH_3C_6H_4SO_2CH_2)_2NH$ | Benzoylperoxide. |
| 3 | $(CH_3C_6H_4SO_2CH_2)_2NH$ | Dichlorobenzoylperoxide. |
| 4 | $(CH_3C_6H_4SO_2CH_2)_2NCH_3$ | Benzoylperoxide. |
| 5 | $(CH_3C_6H_4SO_2CH_2)_2NCH_3$ | Dichlorobenzoylperoxide. |
| 6 | $(CH_3C_6H_4SO_2CH_2)_2NC_2H_5$ | Do. |
| 7 | $(CH_3C_6H_4SO_2CH_2)_2NCH_2C_6H_5$ | Do. |
| 8 | $(CH_3C_6H_4SO_2CH_2)_2NC_2H_4C_6H_5$ | Do. |
| 9 | $(ClC_6H_4SO_2CH_2)_2NCH_3$ | Do. |
| 10 | ($\beta$-Naphthyl-$SO_2CH_2)_2NCH_3$ | Do. |
| 11 | $(CH_3C_6H_4SO_2CH_2)_2NH$ | Di-t-butyldiperphthalate. |
| 12 | $(CH_3C_6H_4SO_2CH_2)_2NH$ | 1 part di-t-butyldiperphthalate + 1 part dichlorobenzoyl-peroxide. |
| 13 | $(CH_3C_6H_4SO_2CH_2)_2NH$ | 1 part cumenehydroperoxide, 1 part dichlorobenzyolperoxide. |

The following examples show the results obtained in various polymerization tests with various hardening pastes according to the invention.

Example 1

A number of hardening pastes according to the invention were tested at a concentration level of 1.5%. 10 g of a polymerizable composition consisting of styrene mixed with an unsaturated polyester resin (30% styrene and 70% of polyglycol maleate) containing 0.3% of an activator consisting of $\beta$-phenylethyl-dibutylamino-acetic acid ethyl ester chloride+8γ Cu++ (as naphthenate) per gram of polymerizable composition were used. The hardening pastes were composed of 60% of the combination of the sulfo amine and the peroxide indicated and 40% of dibutyl phthalate.

The following Table 2 gives the polymerization periods and the maximum temperatures achieved during polymerization.

TABLE 2

| | Catalyst combination | Polymerization time in minutes | Maximum temperature, °C. |
|---|---|---|---|
| 1 | (C₆H₅SO₂CH₂)₂NH+dichlorobenzoylperoxide | 11 | 74 |
| 2 | (CH₃C₆H₄SO₂CH₂)₃NH+benzoylperoxide | 18 | 80 |
| 3 | (CH₃C₆H₄SO₂CH₂)₂NCH₃+dichlorobenzoylperoxide | 18 | 61 |
| 4 | (CH₃C₆H₄SO₂CH₂)₂NC₂H₄C₆H₅+dichlorobenzoylperoxide | 15 | 74 |
| 5 | (ClC₆H₄SO₂CH₂)₂NCH₃+dichlorobenzoylperoxide | 28 | 66 |
| 6 | (β-Naphthyl-SO₂CH₂)₂NCH₃+dichlorobenzoylperoxide | 14 | 75 |

*Example 2*

A further number of hardening pastes according to the invention were tested at a concentration level of 2%. 10 g. of a polymerizable composition were used, consisting of styrene and an unsaturated polyester resin (30% of styrene and 70% of polyglycol maleate) containing 0.2% of an activator consisting of β-phenylethyl-dibutylamine hydrochloride+5γ Cu++ per gram of polymerizable composition. The hardening pastes were composed of 60% of the catalyst combination indicated and 40% of dibutylphthalate.

The following Table 3 gives the polymerization periods and the maximum temperatures achieved during polymerization.

TABLE 3

| | Catalyst combination | Polymerization time in minutes | Maximum temperature, °C. |
|---|---|---|---|
| 1 | (CH₃C₆H₄SO₂CH₂)₂NH+di-t-butyldiperphthalate | 3½ | 98 |
| 2 | (CH₃C₆H₄SO₂CH₂)₂NH+di-t-butyldiperphthalate+dichlorobenzoylperoxide | 3 | 98 |
| 3 | (CH₃C₆H₄SO₂CH₂)₂NH+cumenehydroperoxide+dichlorobenzoylperoxide | 3¾ | 98 |

*Example 3*

Various polymerizable mixtures were tested with various hardening pastes according to the invention. Each of the polymerizable mixtures contained 0.1 to 1% of an activator consisting of betaine ester chloride+2–20γ Cu++ (as naphthenate) per gram of polymerizable mixture.

The following Table 4 gives the polymerization periods and the maximum temperatures achieved during polymerization.

TABLE 4

| Polymerizable mixture (about 10 g.) | Percent hardening paste | Polymerization time in minutes | Maximum temperature, °C. |
|---|---|---|---|
| 80% unsat. polyester of maleic acid anhydride + ethyleneglycol + 20% monomeric methacrylic acid methyl ester | 1.5 paste 1 | 6 | 55 |
| 70% unsat. polyester of maleic acid anydride+1.2-propanediol+30% triallylcyanurate | 4 paste 2 | ¹10 | |
| 50% monostyrene+3% acrylic acid+2% acrylonitrile+45% polystyrene | 3 paste 1 | 210 | 60 |
| Acrylic acid methyl ester | 3 paste 1 | 3 | 110 |
| 97% vinylacetate+3% acrylic acid | 3 paste 4 | 7½ | 115 |

¹ At 80°.

Paste 1=3 parts (CH₃C₆H₄SO₂CH₂)₂NH+5 parts dichlorobenzoylperoxide.
Paste 2=1 part (CH₃C₆H₄SO₂CH₂)₂NH+1 part dichlorobenzoylperoxide.
Paste 3=2 parts (CH₃C₆H₄SO₂CH₂)₂NH+1 part dichlorobenzoylperoxide.
Paste 4=1 part (CH₃C₆H₄SO₂CH₂)₂NH+1 part di-t-butyldiperphthalate.

Each of the pastes were composed of 60% of the catalyst combination in dibutyl and/or dioctyl phthalate.

*Example 4*

A number of polymerization tests were carried out with various halogen carriers as activators. The polymerizable material was 10 g. of styrene mixed with an unsaturated polyester resin (30% of styrene and 70% of polyglycol maleate).

The hardening paste employed was paste1 of Example 3 and 1 γ Cu++ (as naphthenate) per g. of polymerizable composition was employed as an activator.

The following Table 5 gives the polymerization periods and the maximum temperatures achieved during polymerization.

TABLE 5

| | Halogen carrier (0.2% of the polymerizable mixture) | Polymerization time in minutes | Maximum temperature, °C |
|---|---|---|---|
| 1 | Pheylethyldibutylamine HCl | 19 | 84 |
| 2 | Triethylamineoxide HCl | 19 | 78 |
| 3 | Tetraethylammoniumchloride | 28 | 80 |
| 4 | Benzyloxytriethylammoniumchloride | 12 | 83 |
| 5 | Triethylaminoaceticacidethylesterchloride | 15 | 78 |
| 6 | Betainehydrochloride | 27 | 39 |

*Example 5*

A number of polymerization tests were also carried out with different hardening pastes and different activators. The polymerizable material was styrene mixed with an unsaturated polyester resin (30% styrene and 70% of polyglycol maleate).

The following Table 6 gives the results obtained.

TABLE 6

Hardening Paste 1: 60% of 3 parts (CH₃C₆H₄SO₂CH₂)₂NH+5 parts dichlorobenzoylperoxide in 40% of dibutyl phthalate.
Activator 1: 0.07% β aminoester chloride+0.2γ Cu++ per g. of polymerizable mixture.

Hardening Paste 2: 60% of 3 parts (CH₃C₆H₄SO₂CH₂)₂NH+5 parts dichlorobenzoylperoxide in 40% of dibutyl phthalate.
Activator 2: 0.07% β amine HCl+0.3γ Cu++ per g. of polymerizable mixture.

| Percent of hardness | Min. workable time | Polym. time | Max. °C. | $H_{v20}$ 1 day | $H_{v200}$ 1 day | Min. workable time | Polym. time | Max. °C. | $H_{v20}$ 1 day | $H_{v200}$ 1 day |
|---|---|---|---|---|---|---|---|---|---|---|
| 0.7 | 16 | 115 | 32 | 3 | 3.4 | 18 | 120 | 33 | 9.5 | 11.1 |
| 1.0 | 12½ | 63 | 45 | | | 12 | 60 | 49 | 13.0 | 14.3 |
| 1.5 | 10 | 43 | 57 | 13.2 | 14.0 | | | | 16.1 | 16.7 |
| 2.0 | 8½ | 32 | 60 | 18.5 | 19 | 9 | 35 | 69 | 20.3 | 20.3 |
| 3.0 | 6½ | 23 | 61 | 19 | 21 | 7 | 22 | 74 | | |
| 4.0 | 5½ | 19 | 64 | 20 | 21 | 6 | 20 | 70 | 22.1 | 22.2 |

Comparison:
With 0.7% hardener 1+activator 2 $H_{v20}$ 1 day=9.3; $H_{v200}$ 1 day=11.6.
With 1.5% hardener 1+activator 2 $H_{v20}$ 1 day=16.8; $H_{v200}$ 1 day=18.9.
$H_{v20(200)}$ after 1 day=Vickers hardness at 20 g. (200 g.) load after 1 day.

Example 6

Tests were also carried out in a polymerization of a mixture of 77% of an unsaturated polyester (polyglycol maleate) + 33% of monomeric methacrylic acid methyl ester using a hardening paste composed of 60% admixture of 3 parts of $(CH_3C_6H_4SO_2CH_2)_2NCH_2C_6H_5$ +5 parts of dichlorobenzoylperoxide in dibutyl phthalate and 0.07% of β amino ester chloride+0.2γ $Cu^{++}$ per g. of polymerizable composition as activator.

The following Table 7 gives the results obtained.

TABLE 7

| Percent hardness | Castable for. Min. | Polymerization time in minutes | Maximum temperature, °C. |
|---|---|---|---|
| 0.2 | 10-11 | 19½ | 66 |
| 0.5 | 8 | 13½ | 70 |
| 1.0 | 7 | 12 | 68 |
| 2.0 | 5½-6 | 9½ | 73 |

I claim:

1. A substantially stable hardening paste having extended shelf life for use as a catalyst in the polymerization of unsaturated organic compounds comprising a catalytic mixture of at least one catalytic organic peroxidic compound and at least one amine of the formula $$R'\text{---}N(\text{---}CH_2\text{---}SO_2\text{---}R'')_2$$

wherein R' is selected from the group consisting of hydrogen, aliphatic radicals and aliphatic radicals substituted with an aromatic radical, and R" is selected from the group consisting of aromatic radicals and aromatic radicals substituted with an aliphatic radical dispersed in an inert high boiling liquid plasticizer, the quantity of said catalytic mixture in said dispersion being about 60%.

2. The hardening paste according to claim 1 in which said inert liquid plasticizer is viscous.

3. The hardening paste according to claim 1 containing in addition a relatively small quantity of copper as an activator.

4. A hardening paste according to claim 1 containing a finely divided solid inorganic oxide selected from the group consisting of silica and aluminum oxide.

5. The hardening paste according to claim 1 in which said inert liquid plasticizer is an ester of a dibasic acid.

6. The hardening paste according to claim 1 in which said inert liquid plasticizer is a dialkyl phthalate.

References Cited in the file of this patent

UNITED STATES PATENTS

| 2,560,741 | Provost | July 17, 1951 |
| 2,692,892 | Hillyer et al. | Oct. 26, 1954 |

FOREIGN PATENTS

| 708,077 | Great Britain | Apr. 28, 1954 |